United States Patent [19]

Naessl et al.

[11] Patent Number: 5,917,826

[45] Date of Patent: Jun. 29, 1999

[54] METHOD FOR CONTROLLING THE TRANSMISSION OF DIGITAL MESSAGE SIGNALS VIA A TIME-DIVISION MULTIPLEX TRANSMISSION MEDIUM

[75] Inventors: Robert Naessl, deceased, late of Kottgeisering, by Ortrud Ulla Naessl, Manuela Ruth Naessl, Andrea Ella Naessl, heirs; Edwin Wagner, Olching, both of Germany

[73] Assignee: Siemens Aktiengesellschaft, Munich, Germany

[21] Appl. No.: 08/717,066

[22] Filed: Sep. 20, 1996

[30] Foreign Application Priority Data

Sep. 21, 1995 [DE] Germany .......................... 195 35 123

[51] Int. Cl.$^6$ ....................................................... H04J 3/16
[52] U.S. Cl. ............................................................ 370/442
[58] Field of Search ...................................... 370/314, 321, 370/337, 341, 347, 349, 442, 431, 464, 465, 466, 324, 326, 329, 338, 346, 350, 401, 468, 477

[56] References Cited

U.S. PATENT DOCUMENTS

4,009,344   2/1977   Flemming ................................ 370/321

Primary Examiner—Dang Ton
Attorney, Agent, or Firm—Hill & Simpson

[57] ABSTRACT

The transmission of digital message signals of a first and/or second type, for example in the form of data signals and/or digitally encoded voice signals, takes place in time channels of a transmission medium designed for time-division multiplex operation. Timeslots periodically repeatedly appearing in successive pulse frames are allocated to the time channels. The respective time channel is thereby divided into a defined plurality of time sub-channels. In a first embodiment, one of the time sub-channels of the respective time channel is defined as a control channel in which at least a part of the available transmission capacity is reserved for the transmission of control data. Details regarding the type of digital message signal provided for the respective time sub-channel is specified and are contained in these control data. In a second embodiment, one of the time channels is used as common control channel in order to specify the type of digital message signal provided for the time sub-channels of the individual time channels. Flexible bandwidth division is thus possible for the two types of message signals.

8 Claims, 5 Drawing Sheets

METHOD FOR CONTROLLING THE TRANSMISSION OF DIGITAL MESSAGE SIGNALS VIA A TIME-DIVISION MULTIPLEX TRANSMISSION MEDIUM

BACKGROUND OF THE INVENTION

1. Field of the Invention

The present invention relates generally to the field of communications equipment and, more particularly, the present invention relates to a method for controlling the transmission of digital message signals of a first and/or second type in time channels of a time-division multiplexed system.

2. Description of the Related Art

In Time Division Multiplexed systems (TDM), it is sometimes required that message signals of different types be transmitted in individual time channels. Steps must be taken therefor in order to synchronize the equipment connected to one another via such a transmission medium in view of the particular time channel usage.

It is thus an object of the present invention to provide the transmission of digital message signals of a first and/or second type with little control requirements in time channels of a transmission medium designed for a time-division multiplex system.

SUMMARY OF THE INVENTION

The present invention is a system wherein digital message signals of a first or second type can be optionally transmitted in time sub-channels of time channels defined for the transmission medium. Control data regarding the type of message signals to be transmitted in the time sub-channels are specified and transmitted in a time sub-channel that belongs to the respective time channel and is defined as a control channel. Alternately, the control channel is allocated in common to all time channels. It is therefore possible to synchronize the equipment connected to one another over the transmission medium with respect to the use of the sub-channels with little control requirements. The use of the individual time sub-channels is flexible and variable without any requirement that connections in the transmission medium be first cleared down or interrupted.

The present invention is described in greater detail below with reference to the drawings wherein:

DETAILED DESCRIPTION OF THE PREFERRED EMBODIMENTS

Figure 1:
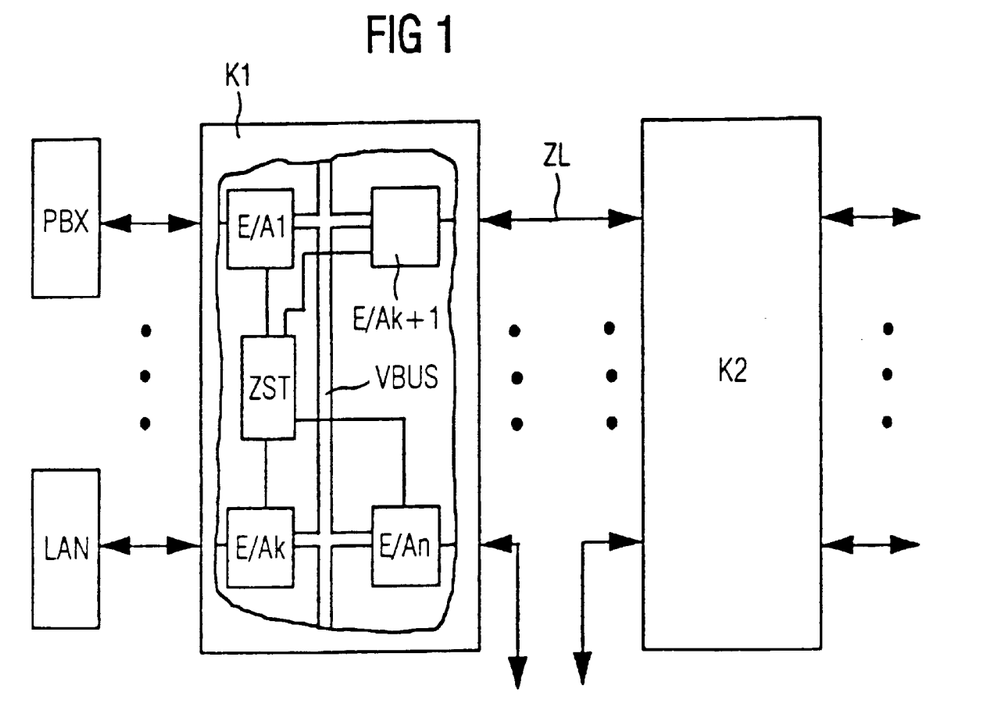
FIG. 1 is a block circuit diagram of a first embodiment of the communication system of the present invention.

FIG. 1 illustrates portions of a communication system that comprises switching networks connected to one another via multiplex transmission media. This may be, for example, in the form of multiplex lines. In this exemplary communication system, connections for digital message signals of different types are conducted over the individual multiplex lines in time-division multiplex format. Data signals and connections for digitally encoded speech signals are examples of such connections.

For the sake of clarity, FIG. 1 illustrates only two switching networks referenced K1 and K2 that are connected to one another via at least one multiplex line ZL. Digital message signals supplied during the course of said connections over multiplex lines are accepted and forwarded via continuing multiplex lines according to the route provided for the respective connection. As indicated with reference to the example of the switching network K1, the switching networks respectively comprise a plurality of line termination means referenced E/A1 . . . E/Ak, E/Ak+1, . . . ,E/An for the connection of the multiplex lines. In the illustrative example, a multiplex line ZL is connected to the line termination means E/Ak+1 belonging to the switching network K1. A telephone private branch exchange PBX for receiving and transmitting digitally encoded voice signals is connected to the line termination means E/A1, and a Local Area Network LAN for the receiving and transmitting of data signals is connected to the line termination means E/Ak.

The line termination means are connected to one another within the respective switching network via an exchange bus, VBUS. The VBUS accepts digital message signals via the line termination means in time-division multiplex format which are then forwarded to line termination means for the individual connections. Respective digital message signals of different types can occur in time-division multiplex format at least on continuing multiplex lines. The receiving and transmitting of the digital message signals by the line termination means is controlled via a central control means ZST. The switching principles used within the switching network which is comprised of the exchange bus VBUS is not discussed in greater detail here because it is not the subject matter of the present invention and those skilled in the art will understand the operation of such devices. An example of such a switching system is disclosed in German Patent Application 19504683.5.

Control of the transmission of message signals of different types in time-division multiplex over the respective multiplex lines is discussed in greater detail below with reference to the multiplex line ZL described above. Similar operation is also valid for other multiplex lines of the communication system.

It is assumed below that time channels for the transmission of digital message signals are defined on the multiplex line ZL. A time slot is respectively allocated thereto in periodically recurring pulse frames. The time channels are respectively divided into a plurality of time sub-channels each having a respectively defined bit width. Digital massage signals of a first type, for example in the form of data signals, or of a second type, for example, in the form of digitally encoded voice signals, can be optionally transmitted therein. In a corresponding way, the timeslot allocated to the respective time channel within a pulse frame is divided into a plurality of sub-timeslots with a respectively defined bit width.

Two exemplary embodiments are described in greater detail below for communication between the switching networks connected with a multiplex line—between the switching networks K1 and K2. Allocation of the time sub-channels to the individual time channels is described below. In the first exemplary embodiment, control information (to be explained in detail later) relating to the occupation of the corresponding time sub-channels is separately transmitted in each of the time channels. In the second exemplary embodiment, by contrast, control information allocated in common to all time channels is transmitted, the occupation of the corresponding sub-channels proceeding individually therefrom for each of the time channels.

Figure 2A:
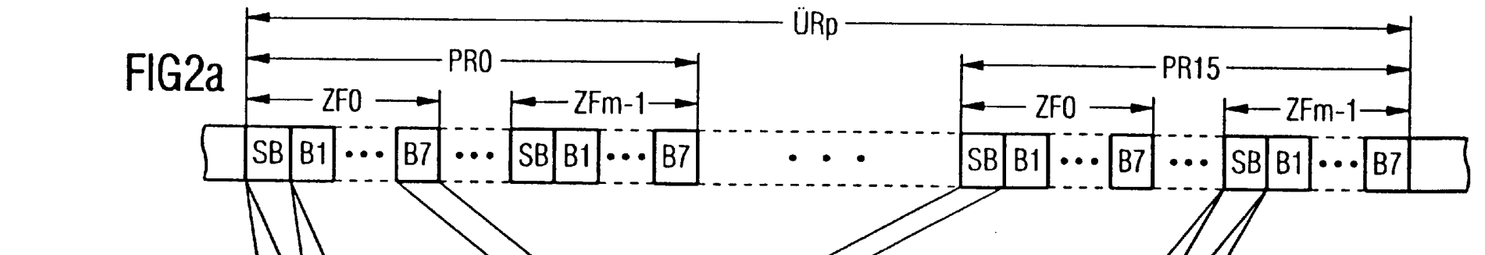
FIGS. 2(a)–2(c) are pulse diagrams for explaining operation of the first exemplary embodiment of the present invention.

FIGS. 2(a) is a pulse diagram for explaining operation of the first exemplary embodiment. It is assumed in this example that a pulse frame structure as recited under a) is defined on the multiplex line ZL. Accordingly, m time channels each having a transmission capacity of, for example, 64 kbit/s are provided on the multiplex line. These are referenced below as ZK0 through ZKm−1. A corresponding time slot is allocated to these time channels in successive pulse frames. The timeslots existing per pulse frame are thereby referenced ZF0 through ZFm−1 according to the allocation to the time channels.

Each of the time channels ZK0 through ZKm−1 is divided, for example, into eight 8 kbit/s time sub-channels with a corresponding bit width of one bit. The time sub-channels are referenced below as SK,UK1, . . . ,UK7. A sub-timeslot having a bit width of one bit is respectively allocated to these time sub-channels per pulse frame. The sub-timeslots allocated to the sub-channels of the respective time channel are referenced SB,B1, . . . ,B7 under a) in FIG. 2(a). Of these time sub-channels of a time channel, for example, the first time sub-channel referenced SK is used as control channel to which the sub-timeslot SB of the respective time channel (ZK0, . . . ,ZKm−1) is allocated in successive pulse frames. It is thereby assumed in the exemplary embodiment that 16 successive pulse frames referenced PR0 through PR 15 under a) form a super-frame. The super-frame is referenced ÜRp here.

Figures 2B, 2C:
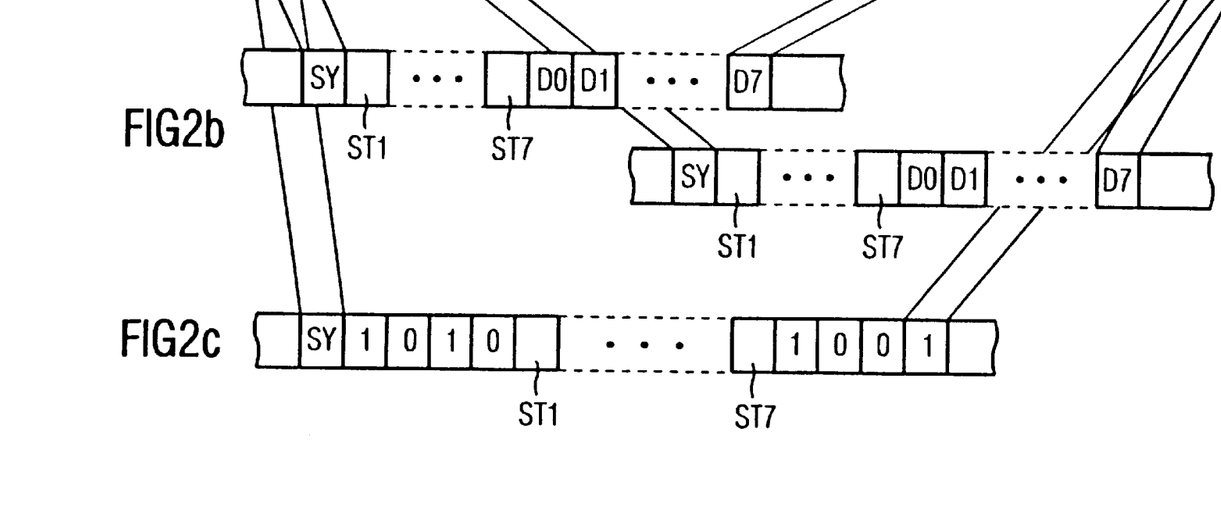

An example of a control bit sequence transmitted in the control channel SK of the respective time channel (ZK0 through ZKm−1) is indicated under b) of FIG. 2(b) with reference to the example of the time channels ZK0 and Zkm−1 for the super-frame ÜRp. The same is also true of the control channels SK of the other time channels. According thereto, a synchronization bit SY identifies the beginning of the super-frame Ürp. It is thus also identifies the beginning of the control bit sequence. It carries a logical level alternating from super-frame to super-frame and is first transmitted in the timeslot SB of the pulse frame PR0 belonging to the time channel ZK0 or, respectively, ZKm−1. This is followed by seven bits transmitted in the pulse frames PR1 through PR7, referenced ST1 through ST7 that are individually allocated to the time sub-channels UK1 through UK7 of the time channel ZK0 or, respectively, Zkm−1. The seven bits have a logical level that respectively indicates what type of digital message signal is transmitted in the following super-frame, i.e. in the super-frame ÜRp+1, respectively in the time sub-channels UK1 through UK7 of the time channel ZR0 or, respectively, ZKm−1. Finally, eight more bits transmitted in the pulse frames PR8 through PR15 and referenced D0 through D7 are provided in the control channel SK of the time channel ZK0 or, respectively, Zkm−1. These are reserved in the present exemplary embodiment for the transmission of data signals.

The transmission of the control bit sequence in the control channel is thus terminated for now. The transmission of a control bit sequence corresponding thereto for the respective time channel repeats in every further super-frame but potentially with modified bits ST1 through ST7 if a change occurs in the occupation of the time sub-channels for the respective time channel.

In the present exemplary embodiment, half the transmission capacity available in the control channel SK of the respective 64 kbit/s time channel—4 kbot/s in the assumed example—is used for the transmission of control information. The remaining half (4 kbit/s) is reserved for the transmission of data signals. In contrast, the time sub-channels UK1 through UK7 belong to the respective time channel. These sub-channels have a transmission capacity of 8 kbit/s and can be selectively occupied for the transmission of data signals or digitally encoded voice signals in compressed form. Two switching networks connected to the respective multiplex line—the switching networks K1 and K2 in the assumed example—are correspondingly synchronized by the control information transmitted in the control channel. In the respective time channel, 60 kbit/s are thus selectively available for pure data transmission or, respectively, for a mixed transmission of data signals and digitally encoded voice signals. Alternatively, 56 kbit/s are available for pure transmission of digitally encoded voice signals with an additional transmission capacity of 4 kbit/s for data signals. This additional transmission capacity can thereby be used for the transmission of signalling data for the individual voice connections.

The above-explained control principle is particularly useful when the occupation of the time sub-channels of the respective time channel changes frequently. This is the case with communication systems having dialed connections. When, by contrast, changes in occupation in the time channels occur comparatively seldom such as in communication systems for direct connections, then one can also alternatively proceed such that a part of the transmission capacity in the afore-mentioned control channel SK of the respective time channel is not constantly reserved for the transmission of a control bit sequence. In such a situation, the full transmission capacity of 8 kbit/s thereof is used for data transmission given an unmodified sub-channel occupation.

Only when there is a required change in occupancy of the time sub-channels is a control bit sequence transmitted in the control channel SK of the respective time channel. This indicates a change in the momentary occupancy. As indicated in FIG. 2(c) under c), for example, such a control bit sequence can be introduced by a synchronization bit SY and a first bit pattern having a fixed plurality of bits. The transmission of seven bits with which the new occupancy of the time sub-channels belonging to the time channel is indicated ensues subsequently. These bits thus correspond to the bits ST1 through ST7 under b) in FIG. 2. The control bit sequence is then terminated by a second bit pattern having a fixed plurality of bits. The first and the second bit pattern as well as their respective length are to be thereby determined such that the control bit sequence can be distinguished in the cooperating location from data signals that are normally transmitted in the channel.

Figure 3A:
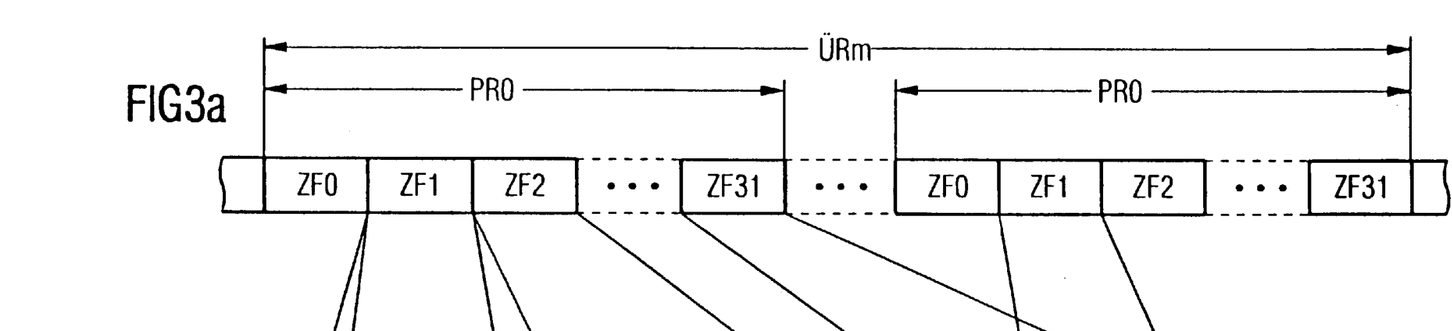
FIGS. 3(a)–3(c) are pulse diagrams for explaining a second exemplary embodiment of the present invention.
Figure 3B:
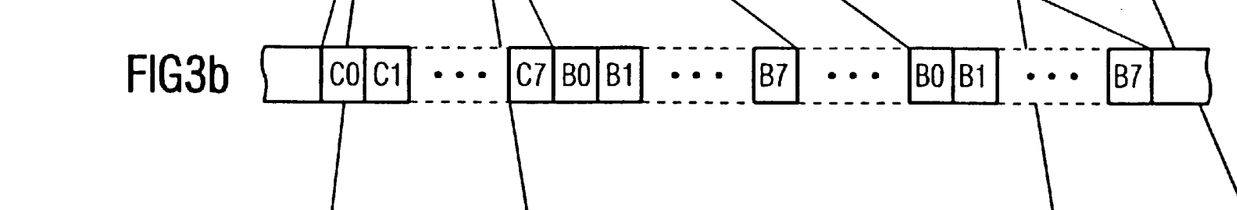
Figure 3C:
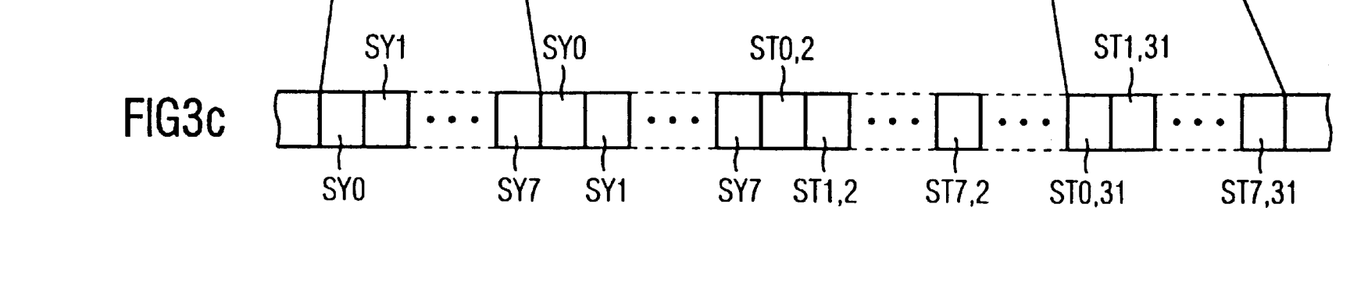

A further exemplary embodiment is discussed below. FIG. 3(a)–3(c) shows a pulse diagram for this embodiment. It is assumed in this example that a frame structure as indicated under a) in FIG. 3(a) is provided on the respective multiplex line. According thereto, 32 time channels each having a respective transmission capacity of, for example, 64 kbit/s are provided on the multiplex line. These are referenced ZK0 through ZK31 below. A respective timeslot in successive pulse frames is allocated to these time channels. The timeslots that exist per pulse frame are thereby referenced ZF0 through ZF31 corresponding to the allocation to the time channels.

Each of the time channels ZK0 through ZKm31 is divided into eight 8 kbit/s time sub-channels with a bit width of one bit each. As in the first exemplary embodiment, one sub-timeslot with a bit width of one bit is respectively allocated to these time sub-channels. Under b) in FIG. 3(b), the sub-timeslots allocated to the time sub-channels of the respective time channel are referenced C0,C1, . . . ,C7 for the time channel ZK1 and B0,B1, . . . ,B7 for the time channels ZK2 through ZK31.

In the time channels ZK0 through ZK31, the time channel ZK1, for example, is used as control channel and the time channels ZK2 through ZK31 are used for the transmission of digital message signals. The time sub-channels of these time channels can be selectively reserved for data signals or digitally encoded voice signals. It is thereby assumed in the exemplary embodiment that 32 successive pulse frames referenced PR0 through PR31 under a) of FIG. 3(a) form a super-frame. Such a super-frame is referenced ÜRm here.

With reference to the super-frame ÜRm, an example of a control bit sequence transmitted in the time channel ZK1 is indicated under c) of FIG. 3(c). According thereto, a synchronization bit sequence SY0, . . . ,SY7 indicates the beginning of the super-frame ÜRm and, thus, the beginning of the control bit sequence is first transmitted in the sub-timeslots C0 through C7 of the timeslot ZF1 allocated to this time channel. The individual bits thereof comprise the respective same logical level alternating from super-frame to super-frame. A bit group respectively comprised of eight bits is then successively transmitted in the sub-timeslots C0 through C7 of the pulse frames PR1 through PR31.

The corresponding eight bits thereof are individually allocated to the time sub-channels of one of the time channels ZK2 through ZK31. The bits of the bit groups are referenced ST0,2; . . . ;ST7,2 through ST0,31; . . . ;ST7,31. The type of digital message signal is transmitted in the next-successive super-frame, i.e. in the super-frame Ürm+1. The respective time sub-channel is thereby indicated by the logical level of the individual bits of such a bit group. The transmission of the control bit sequence in the time channel ZK1 serving as control channel is thus ended. The transmission of a control bit sequence corresponding thereto repeats in every further super-frame. However, it may be with modified bit groups if a change occurs in the occupation of the time sub-channels for the respective time channel.

The control principle described above is particularly useful when occupation of the time sub-channels for the respective time channel changes frequently. When, by contrast, changes in occupation in the time channels occur relatively infrequently, then one can also alternatively proceed such that the afore-mentioned time channel ZK1 is not exclusively reserved for the transmission of a control bit sequence. Rather, this is used for a data transmission in the normal case. Only when there is a required change in occupancy of the time channels ZK2 through ZK31 is a previously described control bit sequence transmitted. This indicates a change in the momentary occupancy. As indicated in the first exemplary embodiment, such a control bit sequence can be introduced by a first bit pattern having a fixed plurality of bits. The transmission of the bit groups ST0,2; . . . ;ST7,2 through ST0,31; . . . ;ST7,31 ensues subsequently to indicate the modified occupancy of the time channels ZK2 through ZK31. The control bit sequence is then terminated by a second bit pattern having a fixed plurality of bits. The first and the second bit pattern as well as their respective length are to be thereby deterimined such that the control bit sequence can be distinguished in the cooperating location from data signals that are normally transmitted in the time channel ZK1.

It should also be pointed out with respect to the above-explained exemplary embodiments that, given bidirectional multiplex lines, the occupation of the time sub-channels of time channels for both transmission directions is separately determined as indicated above.

A possible structure for the line termination means of the switching networks (K1,K2) shown in FIG. 1 is explained below with reference to FIGS. 4 and 5 for realization of the above-described control principles. As an example, the line termination means E/Ak+1 of the switching network K1 connected to the multiplex line ZL is selected here as being representative of the other line termination means for the individual switching networks. Only those circuit elements of these line termination means that are required for an understanding of the invention are thus shown for the sake of clarity. It is assumed in this example that the line termination means connected to one another via a multiplex line are respectively fashioned for bidirectional operation.

Figure 4:
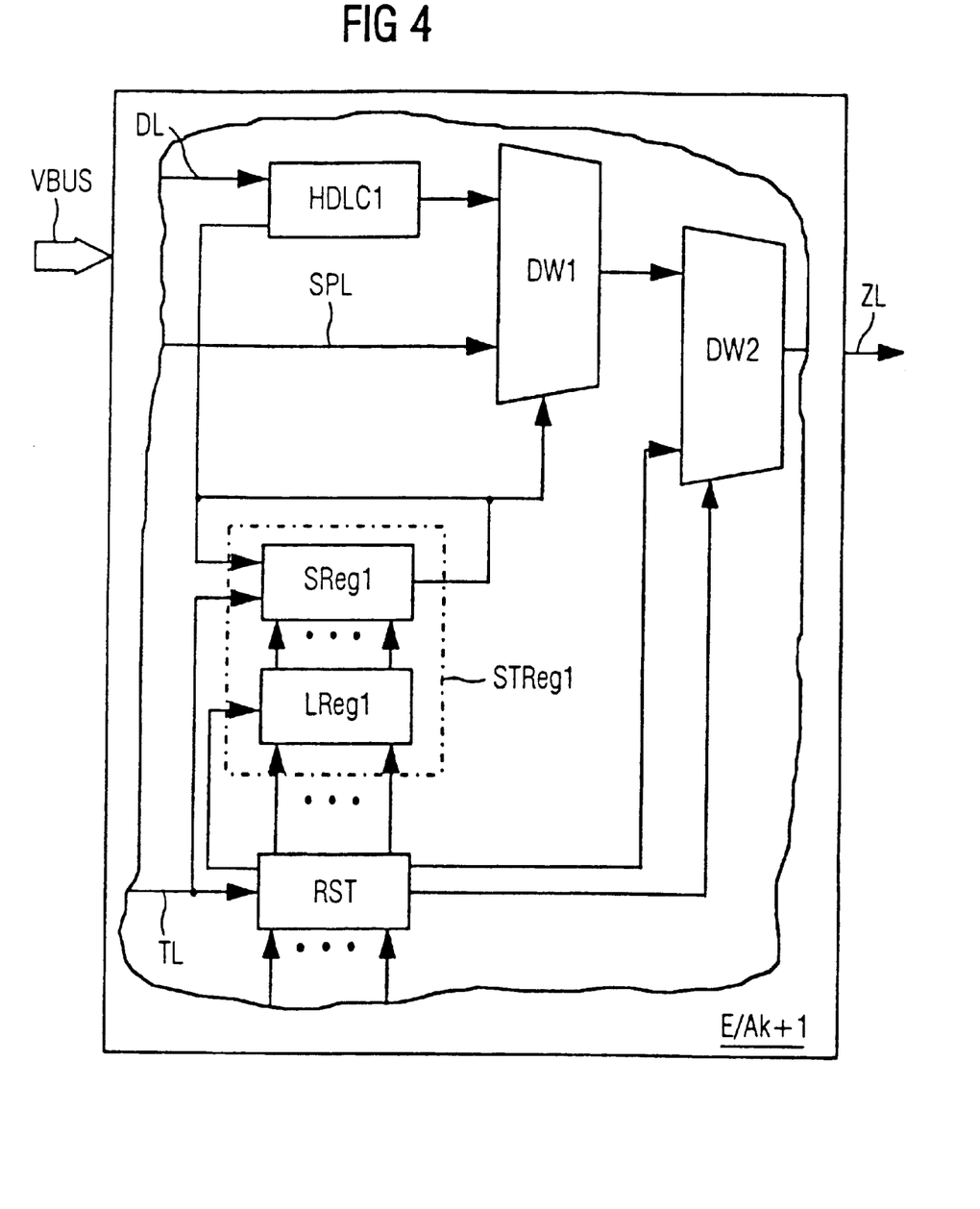
FIG. 4 shows a possible structure for the transmission part of the line termination means shown in FIG. 1.

The transmission portion of the line termination means E/Ak1 is shown in FIG. 4. This receives the data signals and digitally encoded voice signals to be transmitted via the multiplex line ZL which are supplied from the corresponding exchange bus VBUS (FIG. 1). These signals are thereby separated according to type by a device which is not shown and are forwarded bit-by-bit to separate inputs of a data selector 1 via a data line referenced DL1 or, respectively, via a line for voice signals that is referenced SPL1. AN HDLC module is inserted into the data line in order to transmit the data signals over the multiplex line ZL protected according to an HDLC procedure. At the output side, this data selector DW1 is in communication with a first input of a further data selector DW2 that has its output side connected to the multiplex line ZL.

As central control equipment, the transmission portion of the line termination means EIAk+1 also comprises a frame control means RST as well as a control register arrangement STReg1. The transmission of the data signals and digitally encoded voice signals as well as of the control signals via the multiplex line ZL is controlled by these central control equipment according to one of the above-described protocols. For this purpose, the frame control means RST offers a control bit sequence determined according to either the first or second exemplary embodiment. As already mentioned above, the occupation of the time sub-channels for the time channels defined on the multiplex line for or, respectively, beginning with the next super-frame proceeds. Information about this occupation is thereby supplied, for example, from the central control means ZST shown in FIG. 1. This control bit sequence is supplied to a second input of the data selector DW2 bit-by-bit. This data selector is thereby controlled such via a control input by the frame control means RST that the control bit sequence as well as the digital message signals (data signals and digitally encoded voice signals) are output to the multiplex line ZL at the proper time corresponding to the particular frame structure. For this purpose, the frame control means RST receives clock signals in the bit raster supplied to it via a clock line TL. The control signals are derived therefrom.

Additionally, the frame control means RST forwards the control bits for the control bit sequence from which the occupation of the individual time sub-channels proceeds to the afore-mentioned control register arrangement STReg1. For example, this is the bits ST1 through ST7 for each of the time channels in the first exemplary embodiment (b) in FIG. 2(b) or, respectively, the bits ST0,2, . . . ;ST7,2 through ST0,31; . . . ;ST7,31 in the second exemplary embodiment (c) in FIG. 3). Here, these control bits are first transferred into a loading register LReg1 and are transferred therefrom into a shift register Sreg1. This may be in parallel form, at the beginning of a super-frame. For this purpose, the loading register is supplied with appropriate control signals from the frame control means RST.

The shift register SReg1 comprises a register cell for each of the control bits supplied proceeding from the loading register LReg1 and is fashioned as a feedback shift register, data output and data input are connected to one another. Under the control of the clock signals appearing in the bit raster on the afore-mentioned clock line TL, the bit pattern stored in this shift register is shifted by one bit place for each clock signal, so that the control bits allocated to the individual time sub-channels of the multiplex line ZL successively appear at the output of this shift register. Their logical levels are supplied as control signals to the data selector DW1, so that the data signals and digitally encoded voice signals supplied to the two inputs of the data selector DW1 are transmitted over the multiplex line ZL to the cooperating location at the proper time. For example, in the respective time sub-channel, by these control signals when data selector DW2 is enabled for them.

Figure 5:
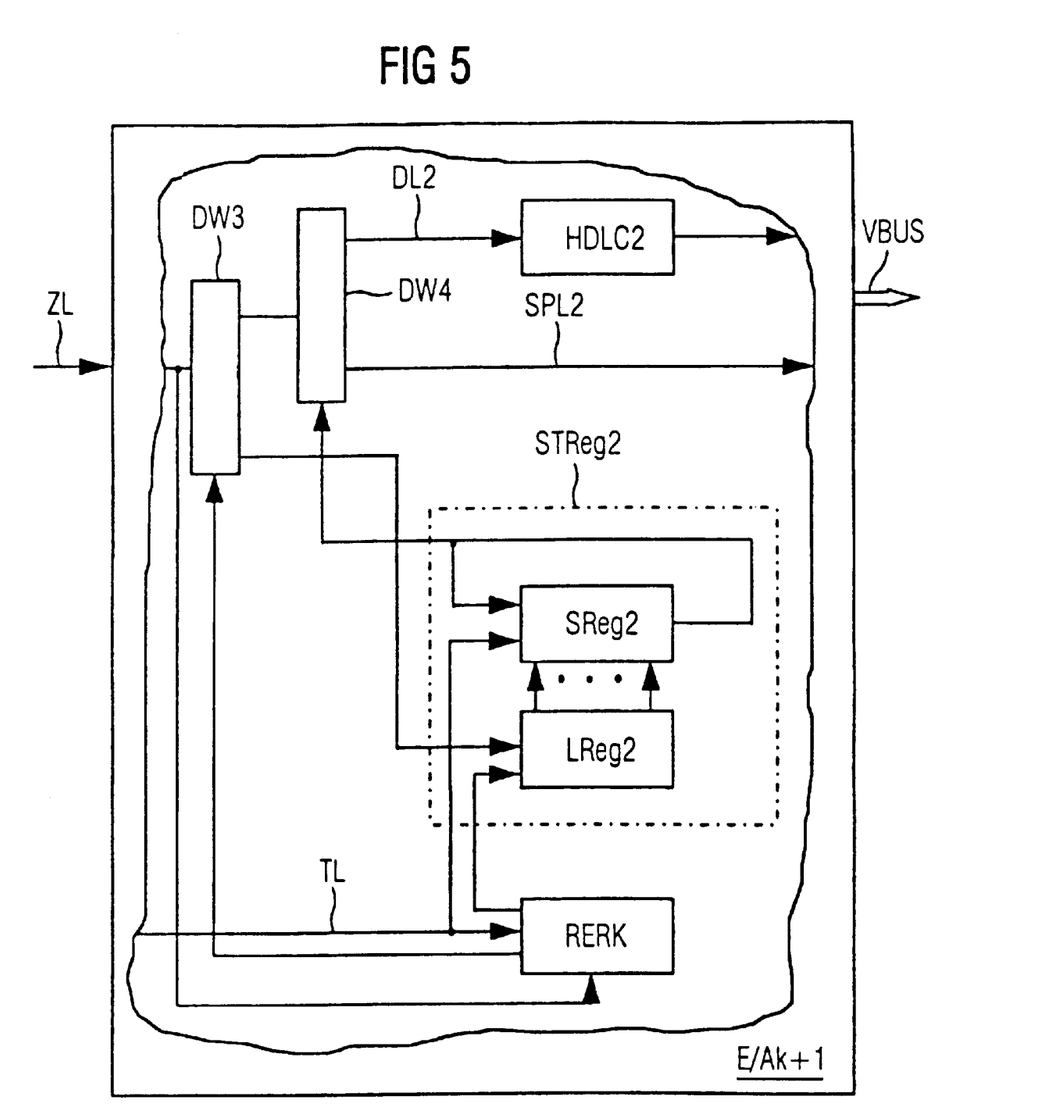
FIG. 5 shows a possible structure for the reception part of the line termination means shown schematically in FIG. 1.

FIG. 5 shows the reception part of the line termination means E/Ak+1. This receives the data signals and digitally encoded voice signals as well as control signals to be transmitted over the multiplex line ZL, supplied at a data selector DW3. This data selector is in communication with the input of a further data selector DW4 via a first output and is in communication via a second output with a shift register arrangement STReg2. The received data signals and digitally encoded voice signals are separated by type via two outputs of the data selector DW4. The data signals are forwarded bit-by-bit to a data line DL2 and the voice signals are transferred on line SPL2 that is also in communication with the exchange bus VBUS (FIG. 1). An HDLC module is thereby inserted into the data line DL2 in order to check the data signal stream to assure error-free transmission.

The control of the two data selectors DW3 and DW4 ensues with the assistance of a frame recognition means REK as well as the afore-mentioned shift register arrangement STReg2. The appearance of a control bit sequence according to the above-explained first or, respectively, second control principle is monitored by the frame recognition means that is connected to the multiplex line ZL. With the beginning of such a control bit sequence, the data selector DW3 is thereby controlled such that the control bits of the control bit sequence from which the occupation of the individual time sub-channels on the multiplex line ZL proceeds are supplied to the control register arrangement STReg2. This may be for example, the bits ST1 through ST7 for each of the time channels in the first exemplary embodiment (b) in FIG. 2(b) or, respectively. the bits ST0,2; . . . ;ST7,2 through ST0,31; . . . ;ST7,31 in the second exemplary embodiment (c) in FIG. 3). Here, these control bits are first transferred into a loading register LReg2 and are transferred therefrom into a shift register SReg2, for example in parallel form, at the beginning of a super-frame. For this purpose, the loading register is supplied with appropriate control signals from the frame recognition means RERK, these being derived from clock signals supplied to the frame recognition means in the bit raster via a clock line TL.

Like the shift register SReg1 of the transmission part (FIG. 4), the shift register SReg2 comprises a register cell for each of the control bits supplied from the loading register LReg2 and is fashioned as a fedback shift register. For example, data output and data input are connected to one another. Under the control of the clock signals appearing in the bit raster on the afore-mentioned clock line TL, the bit pattern stored in this shift register is shifted by one bit place on the occurrence of each clock signal, so that the control bits allocated to the individual time sub-channels of the multiplex line ZL successively appear at the output of this shift register. Their logical levels are supplied as control signals to the data selector DW4, so that the data signals and digitally encoded voice signals supplied to the two inputs of the data selector DW4 are supplied to the exchange bus VBUS at the proper time by these control signals when data selector DW3 is enabled for them.

We claim as our invention:

1. A method for controlling the transmission of digital message signals in time channels of a time-division multiplexed transmission medium comprising the steps of:

allocating timeslots from successive pulse frames to the time channels;

dividing each time channel into a defined plurality of time sub-channels, one of the time sub-channels of the respective time channel being defined as a control channel;

reserving at least a part of an available transmission capacity in the control channel for transmission of control data;

locating information in the control data regarding a type of digital message signal employed in a selected time sub-channel from the corresponding time channel.

2. The method for controlling the transmission of digital message signals of claim 1, further comprising the step of continuously transmitting the control data in the control channel belonging to the respective time channel.

3. The method for controlling the transmission of digital message signals of claim 1, further comprising the step of allocating a portion of a transmission capacity available in the control channel belonging to the respective time channel to the transmission of the control data and allocating a remaining portion for the transmission of digital message signals.

4. The method for controlling the transmission of digital message signals of claim 1, wherein the control data are only transmitted in the respective control channel when the type of digital message signal changes for at least one of the time sub-channels of the respective time channel and further wherein the control channel is used for transmission of digital message signals at all other times.

5. A method for controlling the transmission of digital message signals in time channels of a time-division multiplex transmission medium comprising the steps of:

allocating timeslots appearing in successive pulse frames to the time channels;

dividing each respective time channel into a corresponding defined plurality of time sub-channels, one of said time channels being defined as a common control channel for the transmission of control data for other of said time channels;

locating information in the control data regarding a type of digital message signal employed by each of the time sub-channels for the corresponding time channel.

6. The method for controlling the transmission of digital message signals of claim 5, further comprising a step of continuously transmitting the control data in the common control channel.

7. The method for controlling the transmission of digital message signals of claim 5, comprising the step of transmitting the control data in the common control channel only when the type of digital message signal changes for at least one of the time sub-channels of a time channel; and further wherein the common control channel is used for the transmission of digital message signals at all other times.

8. The method for controlling the transmission of digital message signals of claim 1, wherein data signals are transmitted as first type of message signal and digitally encoded voice signals are transmitted as a second type of digital message signal.

* * * * *